Nov. 7, 1939.   R. J. LAUER   2,179,127
PIPE COUPLING
Filed June 5, 1937
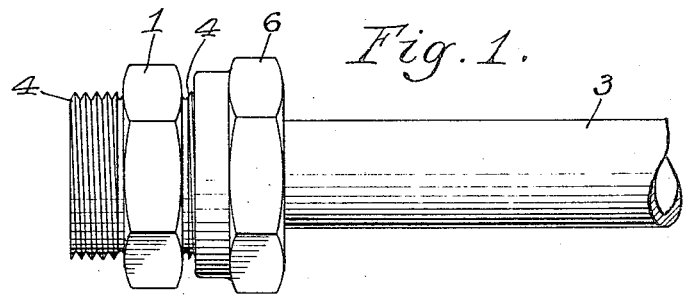
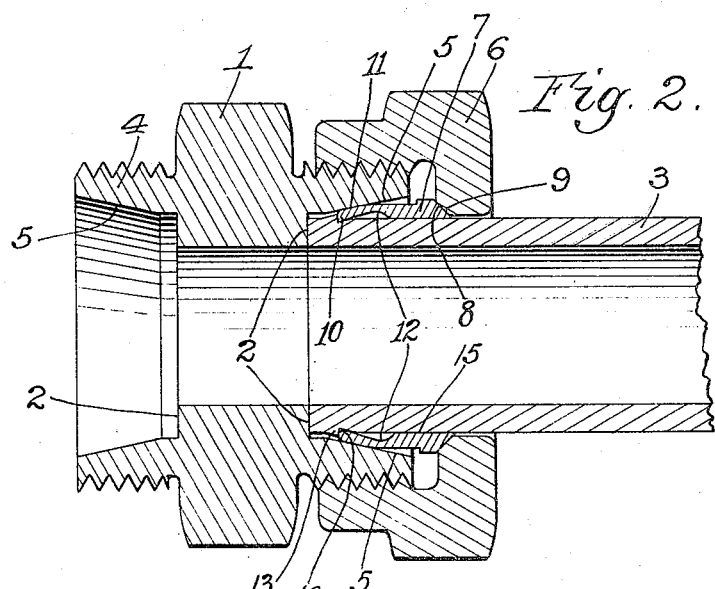
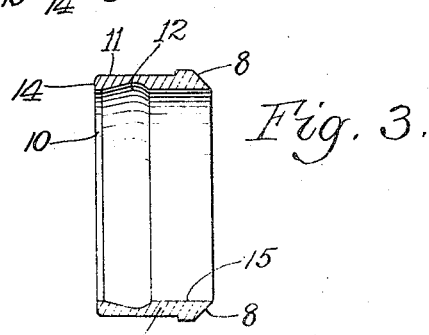
Inventor
Raymond J. Lauer
by Parker & Carter
Attorneys.

Patented Nov. 7, 1939

2,179,127

UNITED STATES PATENT OFFICE 2,179,127

PIPE COUPLING

Raymond J. Lauer, Cicero, Ill., assignor to The Dole Valve Company, Chicago, Ill., a corporation of Illinois Application June 5, 1937, Serial No. 146,652

2 Claims. (Cl. 285—122)

This invention relates to pipe couplings and has for its object to provide a new and improved device of this description. The invention has as a further object to provide a pipe coupling particularly adapted to be used to connect pipes of hard metal, such as steel. The invention has as a further object to provide a pipe coupling for pipes of hard metal, such as steel, by means of which a tight non-leaking joint is formed. The invention has as a further object to provide a pipe coupling for hard pipes, such as steel, which is provided with a pipe engaging member formed so as to force the end of the pipe engaging member into the metal. The invention has further objects which are more particularly pointed out in the accompanying description.

Referring now to the drawing, Fig. 1 is a view showing one form of coupling embodying the invention;

Fig. 2 is an enlarged sectional view therethrough; and

Fig. 3 is a sectional view of the pipe engaging member or sleeve.

Like numerals refer to like parts throughout the several figures.

In the drawing there is illustrated a pipe coupling device which consists of the member 1 into which the end of the pipe is received. This member is provided with an opening and there is a shoulder 2 engaged by the end of the pipe 3. The member 1 is provided with the hollow projecting part 4 which has exterior screwthreads and which is provided on the interior with an inclined or beveled wall 5, there being a space between this inclined wall and the surface of the pipe when the pipe is in position. There is a nut 6 which surrounds the end of the pipe and which has interior screwthreads which engage the exterior screwthreads of the projection 4. There is a pipe engaging member or sleeve 7 which is contained within the projection 4 and the nut 6 and has its forward end in the space between the inclined inner wall of the projection 4 and the outer face of the pipe. The pipe engaging member has an inclined face 8 which is engaged by an inclined face 9 on the nut 6, so that when the nut is tightened, the pipe engaging member will be moved forward. The pipe engaging member 7 is provided with a pipe engaging edge 10 which engages the surface of the pipe, and with a face 11 which engages the inclined face 5 of the member 1.

When the device is used in connection with hard pipe, such as steel, the pipe engaging member 7 is also made of hard material. This pipe engaging member 7 is recessed on its under face as shown at 12, so that the cutting edge 10 will engage the pipe, but the portion of the engaging member 7 back of the cutting edge 10, will be free from the pipe. This portion which is free from the pipe is preferably confined to the portion of the engaging device within the projection 4 of the member 1 and opposite the inclined face thereof. The rear portion of the member 7 is preferably free from this recess 12. The recessing of the member 7 as indicated near its forward end, causes the edge 10, when the nut is tightened, to be bent toward the pipe, due to the exterior face of the engaging member 7 engaging the inclined face 5 of the member 1 and the inclined face of the nut 9 engaging the inclined face 8 of the pipe engaging member. As the movement of the nut 6 continues, the edge 10 of the pipe engaging member digs into the metal of the pipe and forms a shoulder 13 from this metal, which engages the end wall 14 of the pipe engaging member, as clearly shown in Fig. 2, so as to form a complete seal which will seal the connection so that no fluid or liquid passing through the pipe can escape through the coupling. The forward face 14 of the pipe engaging member forms an unbroken face extending from the inner face of the pipe engaging member to the outer face thereof.

The recess 12 in the inner wall of the pipe engaging member reduces the cross sectional area of the pipe engaging member so that the edge 10, all the way around, can be bent inwardly to gouge into the metal of the pipe and form a shoulder 13 thereon. The shoulder 2 holds the pipe against longitudinal movement while the nut 6 is being tightened to form the shoulder 13 on the pipe. In the construction shown, the pipe engaging member 7 has the rear portion 15 of the inner face thereof preferably with a bore substantially the size of the outer diameter of the pipe and a portion of this inner face preferably projects into the member 1 and is opposite the inclined face thereof.

It will thus be seen that when the pipe is in position and the nut 6 is rotated in a forward direction, the shoulder 9 thereon engages the shoulder 8 on the pipe engaging member and moves the pipe engaging member forward into the member 1. The outer face of the forward end of the pipe engaging member 7 engages the inclined face 5 of the member 1 and the edge 10 of the pipe engaging member is pressed inwardly toward the pipe. The forward movement of the pipe engaging member 7 then causes this edge to dig into the metal of the pipe and push the metal forward so as to form the sealing shoulder 13.

I claim:

1. A pipe coupling comprising a pipe receiving member having a screwthreaded projection into which the end of the pipe is received, said projection having an internal inclined wall, a nut fitting over said projection and having a screw-threaded connection therewith, and a pipe engaging member projecting into the projection on the pipe receiving member and having an edge which engages the pipe, the outer face of said pipe engaging member engaging the inclined face of the pipe receiving member, said pipe engaging member being recessed on its inner face, near the pipe engaging edge and to the rear thereof and opposite the inclined face on the pipe receiving member, the inner face of the recessed portion being normally separated from the outer face of the pipe by a space, whereby when the nut is tightened the pipe engaging edge is forced inwardly and digs into the metal of the pipe so as to form a sealing shoulder thereon.

2. A pipe coupling comprising a pipe receiving member having a screw-threaded projection into which the end of the pipe is received, said projection having an internal inclined wall, a nut fitting over said projection and having a screw-threaded connection therewith, and a pipe engaging member projecting into the projection on the pipe receiving member and having an edge which engages the pipe, the outer face of said pipe engaging member engaging the inclined face of the pipe receiving member, said pipe engaging member being recessed on its inner face, near the pipe engaging edge and to the rear thereof and opposite the inclined face on the pipe receiving member, the inner face of the recessed portion being normally separated from the outer face of the pipe by a space, the front face of said pipe engaging member being a continuous face extending to the outer face of said pipe engaging member, whereby when the nut is tightened, the pipe engaging edge is forced inwardly and digs into the metal of the pipe so as to form a sealing shoulder thereon.

RAYMOND J. LAUER.